United States Patent Office 3,647,725
Patented Mar. 7, 1972

3,647,725
ROOM TEMPERATURE VULCANIZABLE
SILICONE RUBBER STOCKS
Siegfried Nitzsche, Wolfgang Kaiser, Ernst Wohlfarth, and Paul Hittmair, Burghausen, Upper Bavaria, Germany, assignors to Wacker-Chemie G.m.b.H., Munich, Bavaria, Germany
No Drawing. Filed Feb. 24, 1970, Ser. No. 13,787
Claims priority, application Germany, Feb. 27, 1969, P 19 10 014.2
Int. Cl. C08h 9/00
U.S. Cl. 260—18 S          11 Claims

ABSTRACT OF THE DISCLOSURE

Organosilicone room-temperature vulcanizing silicone rubber stocks are prepared by admixing $\alpha,\omega$-dihydroxydiorganopolysiloxanes with crosslinking agents of the formula $R_3SiO(R_2SiO)_nSiY_3$ where R is a hydrocarbon or substituted hydrocarbon radical, Y is a hydrolyzable group and $n$ is 0 to 20.

This invention relates to a novel one package or one component room-temperature vulcanizable (RTV) silicone rubber composition.

The room temperature vulcanized silicone rubber stocks heretofore known can be divided into the two component stocks wherein the ingredients are packaged in at least two packages and mixed just prior to use because cure begins almost immediately upon mixing. On the other hand, the one component or one package stocks can be stored almost indefinitely as long as water is excluded and will cure upon exposure to water even in the form of atmospheric moisture. The present invention relates to a novel one-component RTV silicone rubber stock.

In a discussion of organopolysiloxane materials which will cure to elastomers at room temperature, distinction must be made between those which can be prepared more or less immediately before use by mixing at least two components and those which will harden in the air from the effect of the water vapor contained therein without other additives, i.e., between the so-called "two-component systems" and the so-called "one-component systems." The present invention relates to an improvement in the method for preparing materials of the latter type, that is, it relates to methods of preparing organopolysiloxane materials which may be stored under exclusion of water and which will harden when water is admitted.

Silicone rubber stocks which can be stored with the exclusion of water, but which will cure to elastomers at room temperature upon exposure to water, have been known for some time. They are prepared by mixing (1) base polymers which are diorganopolysiloxanes having one reactive group in each terminal unit with (2) crosslinking agents which are organosilicon compounds displaying at least 3 hydrolyzable groups per molecule. The reactive groups in the base diorganopolysiloxanes, which display one reactive group in each terminal unit, are most commonly Si-bonded hydroxyl groups. The organosilicon compounds used as crosslinkers and displaying at least 3 hydrolyzable groups per molecule have generally been silanes. The materials of this type which have previously been known have the disadvantage that they yield elastomers having an elongation at break which is undesirably low for many applications. Those applications for which a high elongation at break is desirable include especially the sealers for joints, in which the edges of the rims to be sealed or joined change considerably and/or frequently over a period of time so that the seals and their adherence to the joint edges are subjected to great stress.

It is known or at least expected that the elongation at break of organopolysiloxane elastomers from one-component systems can be increased if the one-component systems which are hardenable to organopolysiloxane elastomers contain softeners or plasticizers. Generally, trimethylsiloxy endblocked dimethylpolysiloxanes or organosilicon compounds having 2 hydrolyzable groups per molecule are incorporated as plasticizers along with the diorganopolysiloxane base polymers, which have one Si-bonded hydroxyl group in each terminal unit, and the organosilicon compounds having at least 3 hydrolyzable groups per molecule. If the plasticizers are those wherein both chain ends are endblocked by trimethylsiloxy groups, then the softener cannot take part in the curing reaction and the elastomer formed exudes and departs very readily from the composition. On the other hand, if only one end of the chain of the trimethylsiloxy endblocked dimethylpolysiloxane is endblocked by a trimethylsiloxy groups while the other end of the chain displays an Si-bonded hydroxyl group, then such polysiloxanes can be easily converted to inert softeners which depart readily when they are stored because of condensation of the hydroxyl groups. Finally, the expense for the preparation of such softeners has been found to be a disadvantage. Likewise, the expense for preparing organosilicon compounds having 2 hydrolyzable groups per molecule which are useful for increasing the elongation at break of organopolysiloxane elastomers has been found to be a disadvantage. Also, the organosilicon compounds with 2 hydrolyzable groups per molecule must be reacted with the diorganopolysiloxanes having an Si-bonded groups in each terminal unit for some time before the addition of the organosilicon compounds employed as crosslinker which display 3 hydrolyzable groups per molecule. This means that two mixing steps are required for preparing the materials which necessitates further undesired expense. Finally, it has been found that the concurrent use of the organosilicon compounds with two hydrolyzable groups per molecule does not always include the desired success or, brings with it, the danger that the materials will not vulcanize or cure sufficiently or will not vulcanize or cure at all. This results in elastomers with insufficient tensile strengths.

It has now been found that the above disadvantages can be avoided if the organosilicon compounds employed as crosslinking agents, and which contain three hydrolyzable groups per molecule, are specific siloxanes. The materials of the present invention give elastomers with a high elongation at break even if they do not contain the softeners or plasticizers as described supra.

In the preparation of one-component systems, according to the present invention, organosilicon compounds with two hydrolyzable groups are not used, i.e., in conjunction with the monohydroxylated diorganosiloxanes and the organosilicon compounds employed as crosslinking agents and which have at least three hydrolyzable groups per molecule. The elastomers from the materials prepared according to the present invention display surprisingly high tensile strength combined with relatively low Shore hardness.

The subject of this invention is the method of preparing materials which can be stored upon the exclusion of water and which will cure to elastomers at room temperature upon exposure to water by mixing (1) $\alpha,\omega$-dihydroxydiorganopolysiloxanes with (2) organosilicon compounds having 3 hydrolyzable groups per molecule, wherein the diorganopolysiloxanes (1) and the organosilicon compounds displaying 3 hydrolyzable groups per molecule (2) are the only fluid or meltable reactive organosilicon compounds used for preparing the materials (which contain silicon as the only metallic component), wherein the organosilicon compound (2) displaying 3 hydrolyzable groups per molecule are defined by the general formula $R_3SiO(R_2SiO)_nSiY_3$ wherein R is the same or different monovalent hydrocarbon radicals or substituted hydrocarbon radicals, Y represents a hydrolyzable group and $n$ is a number from 0 to 20.

The radicals represented by R can be the same radicals which are present in the diorganopolysiloxanes which are used for the preparation of organopolysiloxane elastomers. Examples of hydrocarbon radicals R include, inter alia, alkyl radicals such as methyl, ethyl, n-propyl, isopropyl and octadecyl radicals; alkenyl radicals such as vinyl, allyl and hexenyl radicals; cycloalkyl radicals and cycloalkenyl radicals such as cyclohexyl and cyclohexenyl radicals; aryl radicals such as phenyl, xenyl and naphthyl radicals; aralkyl radicals such as benzyl and beta-phenylethyl radicals; as well as alkaryl radicals such as tolyl radicals. Examples of substituted hydrocarbon radicals represented by R include, among others, those aliphatic and aromatic hydrocarbon radicals having halogen atoms such as trifluorovinyl, 3,3,3-trifluoropropyl, 4,4,4,3,3-pentafluorobutyl radicals, o-, and m-chlorophenyl radicals and the $\alpha,\alpha,\alpha$-trifluorotolyl radical; cyanoalkyl radicals such as beta-cyanoethyl and gamma-cyanopropyl, omega-cyano-n-butyl, beta-cyano-n-propyl and omega-cyano-octadecyl radicals.

Preferably, the R radicals contain not more than 19 carbon atoms especially not more than 8 carbon atoms; preferably, the radicals are not double branched such as the tertiary butyl radical. The radicals which are bonded to silicon atoms can be alike or different. Because of their ready availability, at least 66% of the number of R radicals are preferred to be methyl radicals and the other R radicals which can be present are preferred to be vinyl radicals and/or phenyl radicals.

The hydrolyzable groups Y can be the same hydrolyzable groups which are present in the materials described as cross-linkers supra. Examples of hydrolyzable groups are acyloxy groups such as formyloxy and acetoxy groups and hydrocarbon radicals bonded to the Si atom across an oxygen atom optionally containing oxygen atoms as ether linkages such as methoxy, ethoxy, isopropenoxy and methoxyethoxy groups; isothiocyano groups; amino groups such as n-butylamino, tertiary-butylamino, cyclohexylamino and 2-ethylhexylamino groups; aminoxy groups such as the diethylaminoxy and dicyclohexylaminoxy groups; acylamino groups such as the N-methyl-N-benzamido groups; aminoalkoxy group such as the aminoethoxy group and oxime groups such as the methylethyl ketoxime groups. The same or different groups can be present in one molecule. Such hydrolyzable groups are well known in the art and need no further illustration.

Since they are especially easy to obtain, acyloxy groups, especially acetoxy groups, and amino groups, especially cyclohexylamino groups are preferred for the Y groups.

It is generally sufficient for $n$ to have a value of 0 but siloxanes having $n$ values up to 20 can be easily incorporated into the mixture.

The organosilicon compounds containing 3 hydrolyzable groups per molecule are prepared according to the present invention by reacting, instead of organotrihalogensilanes as has been done hitherto, compounds of the general formula $R_3SiO(R_2SiO)_nSiX_3$ where R and $n$ are as above defined and every X is a halogen atom, especially a chlorine atom with ammonia, primary or secondary amines, carboxylic acid anhydrides, if desired, mixed with carboxylic acids or alkali metal salts of carboxylic acids, alcohols, N-substituted hydroxyl amines, acid amides, amino alcohols, or oximes, if desired, in the presence of an acid acceptor such as pyridine or triethylamine and an inert solvent.

The organosilicon compounds displaying 3 hydrolyzable groups per molecule are expediently used in such quantities that there is at least one mole of these compounds per gram equivalent of the Si-bonded hydroxyl groups in the diorganopolysiloxanes. Preferably 0.5 to 40% by weight, especially 2 to 20% by weight always calculated on the total weight of the materials to be prepared, of organosilicon compounds containing 3 hydrolyzable groups per molecule are incorporated. Mixtures of various organosilicon compounds containing 3 hydrolyzable groups per molecule can be used.

The diorganopolysiloxanes displacing one Si-bonded hydroxyl group in the terminal unit can be the same for the method of the present invention as those which are commonly used for preparing one-component systems which will cure to organopolysiloxane elastomers. The diorganopolysiloxanes containing one Si-bonded hydroxyl group in each terminal unit can be represented by the general formula

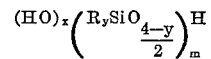

wherein R is as defined above, $x$ is an average of 0.99 to 1.01, $y$ is an average of 1.99 to 2.01, the sum of $x+y$ is 3 and $m$ is a number of at least 3, preferably at least 50.

As is shown by the average value 1.99 to 2.01 for $y$, siloxane units of other degrees of substitution can be present in small quantities in addition to the diorganosiloxane units. The statements which were made supra in connection with the R radicals in the organosilicon compounds having 3 hydrolyzable groups per molecule are also true for the R radicals in the diorganopolysiloxanes displaying one Si-bonded hydroxyl group in each terminal unit.

The viscosity of the diorganopolysiloxanes is preferably in the range of 100 cs. at 25° C. to 200,000 cs. at 25° C. Mixtures of various diorganopolysiloxanes can be used.

In addition to the diorganopolysiloxanes displaying one Si-bonded hydroxyl group in each terminal unit and the organosilicon compounds displaying 3 hydrolyzable groups per molecule, other materials can also be used for the method of the present invention. They can be known materials for the preparation of organopolysiloxane elastomers as long as this does not include fluid or meltable organosilicon compounds containing silicon as the sole metallic component. Examples for the materials which are used with the method of the present invention are reinforcing and/or non-reinforcing fillers, pigments, soluble dyes, corrosion inhibitors, solvents, condensation catalysts such as dibutyltindilaurate and organosiloxytitanium compounds and materials which will stabilize the masses against the influence of water such as acetic acid anhydride. Examples for reinforcing fillers, that is, for fillers with a surface area of more than 50 m.²/g. are fume silicas, silicic acid hydrogels, structured, that is, the so-called silica aerogels and precipitated silica with a large surface.

Examples for non-reinforcing fillers, that is, fillers with a surface of less than 50 m.²/g. are quartz flour, diatomaceous earth, zirconium silicates and the so-called molecular sieves. Fibrous fillers such as asbestos, glass fibers and organic fibers can also be used. Mixtures of various fillers can be used. Preferably, the fillers are used in quantities of 5 to 90% by weight calculated on the total weight of organopolysiloxanes and fillers.

The method of the present invention is preferably carried out at room temperature and with the exclusion of water.

The materials prepared according to the present invention can be stored in the absence of water; they will cure at room temperature under the influence of water whereby, for instance, the normal water content of the air is sufficient. If desired, the curing can also be carried out at higher temperatures than room temperature and/or in the presence of water vapors which exceed the quantity of the normal water content of the air. It will cure more rapidly.

The materials prepared from the elastomers according to the present invention will adhere firmly to the greatest variety of materials such as glass porcelain, wood, paper, plaster, concrete, mortar, metals, organic and organosilicon synthetics, optionally, after using the usual priming materials. The materials prepared according to the present invention, therefore, lend themselves not only for sealing joints and similar empty spaces, for instance, in buildings, especially those of prefabricated building components, as well as land, water and aircraft, but also, for instance, as adhesives or putties for the preparation of protective coatings, coatings on paper to obtain an adhesive effect for preparing insulation for electrical conductors by spraying the conductors with the materials and for preparing molded articles.

The organosilicon compounds displaying 3 hydrolyzable groups per molecule and used in the following examples were prepared as follows:

(a) 111.8 g. of 1,1,1-trimethyl-3,3,3-trichlorodisiloxane [$(CH_3)_3SiOSiCl_3$] was added dropwise to a mixture of 180 g. acetic anhydride and 18 g. of water free acetic acid in a 1 liter flask with a reflux condenser, thermometer, stirrer and dropping funnel, under the exclusion of water while stirring vigorously. After terminating the addition of disiloxane, the flask was heated to 100° C. for 8 hours via a boiling water bath while stirring. Thereafter, the volatile components in the reaction mixture were distilled off at a temperature rising gradually to 110° C. The residue obtained from this distillation in a quantity of 144 g. was a fluid consisting essentially of 1,1,1-trimethyl-3,3,3-triacetoxydisiloxane $$[(CH_3)_3SiOSi(OAc)_3]$$

where Ac is acetyl.

(b) 111.8 g. of 1,1,1-trimethyl-3,3,3-trichlorodisiloxane was added dropwise to a solution of 327 g. cyclohexylamine and 800 ml. methylenechloride in the apparatus described under (a) while excluding water and stirring vigorously and care was taken that the temperature of the flask content did not exceed 20° C. by external cooling of the flask by means of water. After terminating the addition of disiloxane, the flask was heated for another hour at room temperature and two hours at a bath temperature of 60° C. After cooling, the amine salt was filtered off and the filtrate was freed of volatile components at 60° C., first at normal atmospheric pressure and finally at 10 mm. Hg (abs.). The residue was filtered. The filtrate amounted to 179 g. and was an oily fluid consisting essentially of 1,1,1-trimethyl-3,3,3-tricyclohexylaminodisiloxane.

(c) 87 g. of methylethylketoxime in 400 ml. toluene was added dropwise to a solution of 74.5 g. 1,1,1-trimethyl-3,3,3-trichlorodisiloxane and 88 g. water free pyridine in 770 ml. toluene in the apparatus described under (a) excluding water and stirring vigorously. After terminating the addition of ketoxime, it was stirred for another four hours at room temperature. After standing overnight, the pyridinium hydrochloride was filtered off and the filter cake was washed with toluene. The purified filter was then freed of volatile components at 140° C. and normal atmospheric pressure and then at 70° C. and 10 mm. Hg (abs.). The residue amounted to 113 g. of an oily fluid consisting essentially of the compound of the formula $(CH_3)_3SiOSi[ONC(CH_3)C_2H_5]_3$.

EXAMPLE 1

100 g. of a mixture of 100 parts by weight of a dimethylpolysiloxane displaying one Si-bonded hydroxyl group in each terminal unit with 20,000 cs. at 25° C., 25 parts by weight quartz flour and 25 parts by weight diatomaceous earth were first mixed with 0.5 ml. acetic acid anhydride and three hours later with a mixture of 4 ml. of the fluid consisting essentially of 1,1,1-trimethyl-3,3,3-triacetoxydisiloxane and 0.1 ml. dibutyltindilaurate (Test A).

For purposes of comparison, the procedure described above was repeated with the alternation that in place of the 4 ml. of disiloxane, 3 ml. methyltriacetoxysilane was used (Test V). The amount of silane used for this and the following comparison test was smaller than the amount of disiloxane used in the method of the present invention because the portion of hydrolyzable groups in the silane molecule was greater than in the disiloxane molecule.

Thin layer films were formed from this material by remaining in the air and these properties were measured after three weeks. The following results were obtained:

|  | Shore hardness A | Breaking elongation, percent | Tensile strength (kg./cm.²) |
|---|---|---|---|
| Test: |  |  |  |
| A | 32 | 610 | 24 |
| V | 42 | 400 | 20 |

EXAMPLE 2

100 g. of a mixture of 50 parts by weight of a dimethylpolysiloxane displaying one Si-bonded hydroxyl group in each terminal unit, 80,000 cs. at 25° C., 30 parts by weight of a dimethylpolysiloxane displaying one Si-bonded hydroxyl group in each terminal unit, 20,000 cs. at 25° C., 30 parts by weight of calcium aluminum silicate and 8 parts by weight of fume silica were mixed with 6.5 ml. of the fluid consisting essentially of 1,1,1-trimethyl-3,3,3-tricyclohexylaminodisiloxane (Test B).

For purposes of comparison, the procedure described above was repeated with the alteration that instead of the 6.5 ml. of the aminodisiloxane, 4.5 ml. of a fluid consisting essentially of methyltris(cyclohexylamino)silane was used (Test V'). From the materials, thin films were formed by standing in the air whose properties were measured after 14 days. The following results were obtained:

|  | Shore hardness A | Breaking elongation, percent | Tensile strength (kg./cm.²) |
|---|---|---|---|
| Test: |  |  |  |
| B | 38 | 350 | 37 |
| V' | 52 | 240 | 32 |

EXAMPLE 3

The procedures described in Example 2 were repeated with the alteration that instead of the mixture of diorganopolysiloxanes and fillers described in Example 2, 100 g. of a mixture of 18 parts by weight of a dimethylpolysiloxane displaying one Si-bonded hydroxyl group in each terminal unit, 80,000 cs. at 25° C., 9 parts by weight of a dimethylpolysiloxane displaying one Si-bonded hydroxyl group in the terminal unit, 20,000 cs. at 25° C., 15 parts by weight calcium carbonate and 5 parts by weight fume silica are used (Tests C and V"). The following results were obtained:

|  | Shore hardness A | Breaking elongation, percent | Tensile strength (kg./cm.²) |
|---|---|---|---|
| Test: |  |  |  |
| C | 38 | 460 | 22 |
| V" | 47 | 280 | 19 |

EXAMPLE 4

100 g. of a mixture of 100 parts by weight of a dimethylpolysiloxane displaying one Si-bonded hydroxyl group in each terminal unit, 20,000 cs. at 25° C., 25 parts by weight quartz flour and 25 parts by weight diatomaceous earth were mixed with 7 ml. of the fluid consisting essentially of $(CH_3)_3SiOSi[NOC(CH_3)(C_2H_5)]_3$ and 0.1 ml. dibutyltindilaurate (Test D).

For purposes of comparison, the procedure described above was repeated with the alteration that instead of the 7 ml. of the oxime disiloxane, 5 ml. of a fluid consisting essentially of the compound of the formula $$CH_3Si[ONC(CH_3)C_2H_5]_3$$

was used (Test V'''). From these materials, thin layer films were formed by standing in the air whose properties were measured after 3 weeks. The following results were obtained:

| Test: | Shore hardness A | Breaking elongation, percent | Tensile strength (kg./cm.²) |
|---|---|---|---|
| D | 30 | 620 | 26 |
| V''' | 38 | 450 | 23 |

EXAMPLE 5

When the following siloxanes are substituted for the base polymer of Example 1, equivalent results are obtained:

| Unit: | Mole ratio |
|---|---|
| $[(CH_3)_2SiO]$ | 40 |
| $[(C_6H_5)CH_3SiO]$ | 60 |
| $[(CH_3)_2SiO]$ | 90 |
| $[(C_6H_5)_2SiO]$ | 10 |
| $[(CH_3)_2SiO]$ | 75 |
| $[(CF_3CH_2CH_2)(CH_3)SiO]$ | 25 |
| $[(CH_3)_2SiO]$ | 95 |
| $[(CH_2=CH)(CH_3)SiO]$ | 5 |

EXAMPLE 6

When the following siloxanes containing three hydrolyzable groups were substituted for the siloxanes containing three hydrolyzable groups of Examples 1, 2 and 3, equivalent results were obtained:

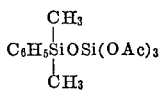

$$C_6H_5\underset{\underset{CH_3}{|}}{\overset{\overset{CH_3}{|}}{Si}}OSi(OAc)_3$$

where Ac is acetyl $$CF_3CH_2CH_2\underset{\underset{CH_3}{|}}{\overset{\overset{CH_3}{|}}{Si}}OSi[ONC(CH_3)C_2H_5]_3$$

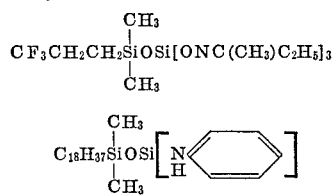

EXAMPLE 7

When the following organosilicon compounds containing three hydrolyzable groups are substituted for the organosilicon compounds containing three hydrolyzable groups of Example 1, equivalent results are obtained:

$$(CH_3)_3SiO[(CH_3)_2SiO]_xSi(O\overset{O}{\overset{\|}{C}}CH_3)_3 \quad x=2$$

$$(CH_3)_3SiO[(CH_3)_2SiO]_xSi(O\overset{O}{\overset{\|}{C}}CH_3)_3 \quad 18$$

$$(CH_3)_3SiO[(CH_3)(C_6H_5)SiO]_xSi(O\overset{O}{\overset{\|}{C}}CH_3)_3 \quad 6$$

That which is claimed is:

1. A composition curable to form elastomers which is admixed and stored in the fluid form, with the exclusion of moisture, consisting essentially of a mixture of (1) diorganopolysiloxanes displaying two silicon bonded hydroxyl groups on the average for each molecule, having a viscosity in the range from 100 to 200,000 cs. at 25° C., the organic substituents being monovalent hydrocarbon radicals, monovalent halogenohydrocarbon radicals, or cyanoalkyl radicals of less than 19 carbon atoms and (2) a crosslinking organosilicon compound of the general formula $R_3SiO(R_2SiO)_nSiY_3$ wherein each R is a monovalent organic substituent of less than 19 carbon atoms and is a hydrocarbon radical, a halogenohydrocarbon radical or a cyanoalkyl radical, each Y is an acyloxy radical, an amino radical or an aminoxy radical, n has a value from 0 to 20, components (1) and (2) being the only fluid or meltable reactive organosilicon compounds in the mixture which contain silicon as the sole metallic element.

2. A composition in accordance with claim 1 wherein the diorganopolysiloxane (1) has at least 66 percent of the number of R radicals as methyl radicals and the remaining R radicals are either phenyl or vinyl.

3. A composition in accordance with claim 1 wherein the organosilicon compound (2) containing three hydrolyzable groups is used in the weight range of 0.5 to 40 percent calculated on the total weight of the materials to be prepared.

4. A composition in accordance with claim 1 wherein mixtures of organosilicon compounds that contain 3 hydrolyzable groups per molecule can be used as component (2).

5. A composition in accordance with claim 1 wherein the component (1) is a monohydroxy endblocked diorganopolysiloxane having the general formula $$(HO)_x\left(R_ySiO_{\frac{4-y}{2}}\right)_m H$$

wherein R is defined aboxe, $x$ is an average of 0.99 to 1.01, $y$ is an average of 1.99 to 2.01, the sum of $x+y$ is 3 and $m$ is a number of at least 3 and preferably at least 50.

6. A composition in accordance with claim 1 wherein the diorganopolysiloxane is a copolymer consisting of $(CH_3)_2SiO$ units in conjunction with less than 60 mole percent $(C_6H_5)(CH_3)SiO$ units or less than 10 mole percent $(C_6H_5)_2SiO$ units or 5 mole percent $(CH_3)(CH_2=CH)SiO$ units or less than 25 mole percent $(CF_3CH_2CH_2)(CH_3)SiO$ units.

7. A composition in accordance with claim 1 wherein the diorganopolysiloxane component (1) is a copolymer of units selected from the group consisting of $(CH_3)_2SiO$, $C_6H_5(CH_3)_2SiO$, $(C_6H_5)_2SiO$, $CF_3CH_2CH_2(CH_3)SiO$ and $CH_3(CH_2=CH)SiO$.

8. A composition in accordance with claim 1 wherein it contains from 5 to 90 percent by weight, based on the total weight of the composition, of a filler.

9. A composition in accordance with claim 1 wherein it contains a condensation catalyst.

10. A composition in accordance with claim 1 wherein it contains acetic acid anhydride in quantities sufficient to stabilize the composition against the influence of residual water.

11. A composition in accordance with claim 9 wherein the condensation catalyst is dibutyltindilaurate or an organosiloxytitanium compound.

References Cited

UNITED STATES PATENTS

| | | | |
|---|---|---|---|
| 3,419,516 | 12/1968 | Tarno | 260—37 |
| 3,189,576 | 6/1965 | Sweet | 260—46.5 |
| 3,240,731 | 3/1966 | Nitzsche et al. | 260—18 |
| 3,294,739 | 12/1966 | Weyenberg | 260—46.5 |
| 3,398,112 | 8/1968 | Johnson et al. | 260—37 |
| 3,419,593 | 12/1968 | Willing | 260—448.2 |
| 3,476,826 | 11/1969 | Millen | 260—824 |
| 3,440,206 | 4/1969 | Pande et al. | 260—37 |

DONALD E. CZAJA, Primary Examiner

M. I. MARQUIS, Assistant Examiner

U.S. Cl. X.R.

117—124 F, 125, 135.1, 138.8 A, 148, 155 R; 252—63.7; 260—375 B, 46.5 G, 46.5 E, 77.5 AT, 825